United States Patent
Byun

(10) Patent No.: US 11,113,189 B2
(45) Date of Patent: Sep. 7, 2021

(54) MEMORY SYSTEM TO PERFORM READ RECLAIM AND GARBAGE COLLECTION, AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 55 days.

(21) Appl. No.: 16/597,229

(22) Filed: Oct. 9, 2019

(65) Prior Publication Data

US 2020/0310959 A1 Oct. 1, 2020

(30) Foreign Application Priority Data

Mar. 25, 2019 (KR) .................. 10-2019-0033914

(51) Int. Cl.
*G06F 12/02* (2006.01)
*G06F 13/16* (2006.01)
*G06F 3/06* (2006.01)

(52) U.S. Cl.
CPC .......... *G06F 12/0246* (2013.01); *G06F 3/064* (2013.01); *G06F 3/0608* (2013.01); *G06F 3/0659* (2013.01); *G06F 3/0679* (2013.01); *G06F 12/0253* (2013.01); *G06F 13/1668* (2013.01); *G06F 2212/7201* (2013.01)

(58) Field of Classification Search
CPC .. G06F 12/0253; G06F 13/1168; G06F 3/064; G06F 3/0652
See application file for complete search history.

(56) References Cited

U.S. PATENT DOCUMENTS

| | | | |
|---|---|---|---|
| 2014/0215129 A1* | 7/2014 | Kuzmin | G06F 12/0246 711/103 |
| 2016/0062885 A1* | 3/2016 | Ryu | G06F 12/0246 711/103 |
| 2017/0177425 A1* | 6/2017 | Jei | G06F 11/1072 |

FOREIGN PATENT DOCUMENTS

| KR | 10-2017-0095524 | 8/2017 |
|---|---|---|
| KR | 10-2018-0059208 | 6/2018 |

* cited by examiner

*Primary Examiner* — David Yi
*Assistant Examiner* — Nicholas A. Paperno
(74) *Attorney, Agent, or Firm* — IP & T Group LLP

(57) ABSTRACT

Provided herein is a memory system and a method of operating the same. According to the present technology, a memory system performs a garbage collection operation based on a ratio of a read count value of a memory block with reference to a read count threshold value of a read reclaim operation. Consequently, the read reclaim operation and the garbage collection operation may be prevented from overlapping with each other.

19 Claims, 9 Drawing Sheets

MEMORY SYSTEM TO PERFORM READ RECLAIM AND GARBAGE COLLECTION, AND METHOD OF OPERATING THE SAME

CROSS-REFERENCE TO RELATED APPLICATION

The present application claims priority under 35 U.S.C. § 119(a) to Korean patent application number 10-2019-0033914, filed on Mar. 25, 2019, which is incorporated herein by reference in its entirety.

BACKGROUND

Field of Invention

Various embodiments of the present disclosure generally relate to an electronic device, and more particularly, to a memory system and a method of operating the memory system.

Description of Related Art

Recently, the paradigm for the computer environment has been converted into ubiquitous computing so that computer systems can be used anytime and anywhere. Thereby, the use of portable electronic devices such as mobile phones, digital cameras, and notebook computers has rapidly increased. In general, such portable electronic devices use a memory system which employs a memory device, in other words, use a data storage device. The data storage device is used as a main memory device or an auxiliary memory device of the portable electronic devices.

A data storage device using a memory device provides advantages in that, since there is no mechanical driving part, stability and durability are excellent, an information access speed is increased, and power consumption is reduced. Examples of data storage devices having such advantages, may include a universal serial bus (USB) memory device, a memory card having various interfaces, a solid state drive (SSD), and so forth.

Memory devices are classified into volatile memory devices and nonvolatile memory devices.

A nonvolatile memory device, although having comparatively low read and write speeds, may retain data stored therein even when a power supply is interrupted. Therefore, the nonvolatile memory device is used when there is the need for storing data which is required to be retained regardless of whether or not it is connected to a power supply. Representative examples of the nonvolatile memory device include a read-only memory (ROM), a mask ROM (MROM), a programmable ROM (PROM), an erasable programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. The flash memory is classified into a NOR type memory and a NAND type memory.

SUMMARY

Various embodiments of the present disclosure area directed to a memory system capable of controlling a garbage collection operation and a read reclaim operation such that the garbage collection operation and the read reclaim operation are performed without overlapping with each other, and a method of operating the memory system.

An embodiment of the present disclosure may provide for a memory system including: a memory device having a plurality of memory blocks; a controller configured to manage a read count value of each of the memory blocks and generate level information corresponding to the read count value; and a host configured to output a host command for requesting a garbage collection operation of the memory device based on the level information.

An embodiment of the present disclosure may provide for a memory system including: a memory device including a plurality of memory blocks; a controller configured to control the memory device to perform a read reclaim operation based on a read count value of a memory block on which a read operation has been completed or generate level information based on the read count value of the memory block; and a host configured to manage, based on the level information, a read count value of each of logical addresses corresponding to memory blocks on which the read operation has been completed.

An embodiment of the present disclosure may provide for a method of operating a memory system, including: performing a read reclaim operation based on a first read count value of a memory block on which a read operation has been completed, or generating level information of the first read count value; managing, based on the level information, a second read count value of each of logical addresses corresponding to memory blocks on which the read operation has been completed; and performing the garbage collection operation based on the second read count value of each of the logical addresses.

An embodiment of the present disclosure may provide for a method of operating a memory system, including: performing a read reclaim operation to a memory block, a physical read count of which is an RRC threshold or greater among the memory blocks; arranging logical read counts of the respective memory blocks based on physical read counts of the respective memory blocks by weighting one or more partial groups of the logical read counts, the physical read counts corresponding to the respective partial groups falling within respective ranges with respect to the RRC threshold; and performing a garbage collection operation to one or more memory blocks, each logical read count of which is a GC threshold or greater among the memory blocks.

DETAILED DESCRIPTION

Figure 1:
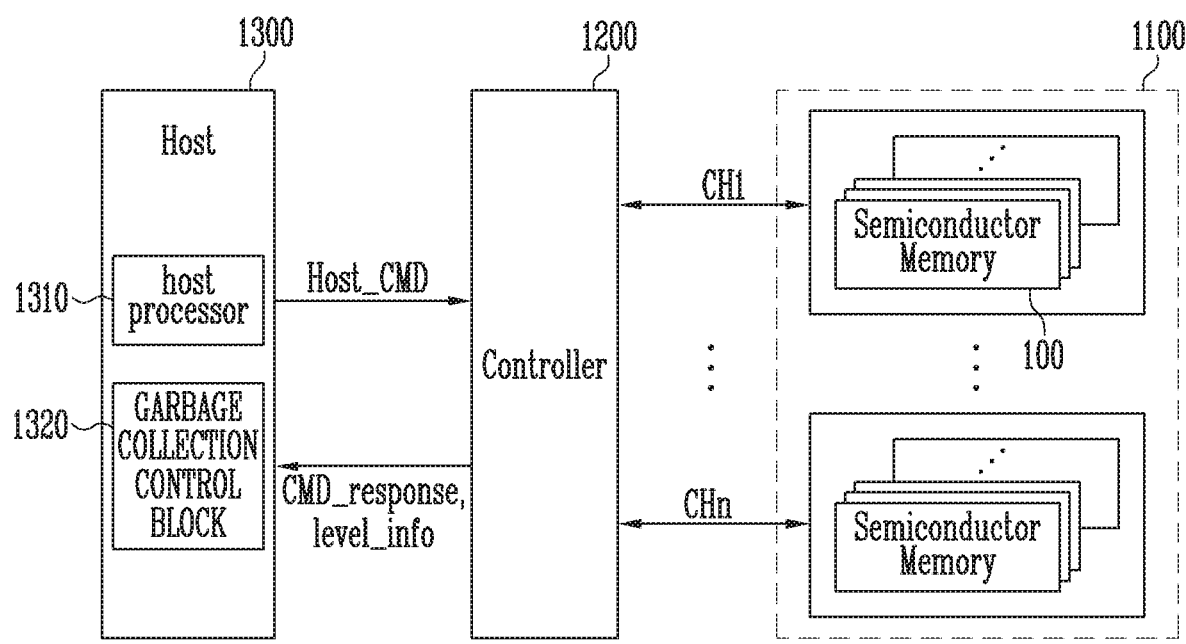
FIG. 1 is a block diagram illustrating a memory system in accordance with an embodiment of the present disclosure.

Specific structural or functional descriptions of the embodiments of the present disclosure introduced in this specification or application are only for description of the embodiments of the present disclosure. The embodiments should not be construed as being limited to the descriptions disclosed in this specification or application.

The present disclosure will now be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are shown, so that those of ordinary skill in the art can easily carry out the technical idea of the present disclosure.

FIG. 1 is a block diagram illustrating a memory system 1000 in accordance with an embodiment of the present disclosure.

Referring to FIG. 1, the memory system 1000 may include a memory device 1100, a controller 1200, and a host 1300. The memory device 1100 may include a plurality of semiconductor memories 100. The plurality of semiconductor memories 100 may be divided into a plurality of groups. Although in the present embodiment the host 1300 has been illustrated and described as being included in the memory system 1000, the memory system 1000 may include only the controller 1200 and the memory device 1100, and the host 1300 may be disposed outside the memory system 1000.

In FIG. 1, it is illustrated that the plurality of groups of the memory device 1100 communicate with the controller 1200 through first to n-th channels CH1 to CHn, respectively. Each semiconductor memory 100 will be described below with reference to FIG. 4.

Each of the plurality of groups of semiconductor memories 100 may communicate with the controller 1200 through one common channel. The controller 1200 may control the plurality of semiconductor memories 100 of the memory device 1100 through the plurality of channels CH1 to CHn.

The controller 1200 is coupled between the host 1300 and the memory device 1100. The controller 1200 may access the memory device 1100 in response to a request from the host 1300. For example, the controller 1200 may control a read operation, a write operation, an erase operation, or a background operation of the memory device 1100 in response to a host command Host_CMD received from the host 1300. During a write operation, the host 1300 may transmit data and an address along with a host command Host_CMD. During a read operation, the host 1300 may transmit an address along with a host command Host_CMD. The addresses may be logical addresses. After having performed a read operation, a write operation, or an erase operation in response to a host command Host_CMD, the controller 1200 may output a command response signal CMD_response corresponding to a result of the completed operation, to the host 1300.

After a read operation the controller 1200 may check a read count value of a memory block within the memory device 1100 on which the read operation has been performed, and perform a read reclaim (hereafter, referred to as "RRC") operation on the corresponding memory block based on a result of the checking. Furthermore, the controller 1200 may generate level information level_info based on the checked read count value of the memory block and transmit the level information level_info to the host 1300. The level information level_info indicates a ratio of a read count value of each of the memory blocks with reference to a read count threshold value of the RRC operation. The level information level_info along with a command response signal CMD_response may be output to the host 1300.

The host 1300 may include a host processor 1310, and a garbage collection control block 1320.

The host processor 1310 may generate at least one host command Host_CMD corresponding to a user request and transmit the host command Host_CMD to the controller 1200. Furthermore, the host processor 1310 may generate a host command Host_CMD to perform a garbage collection (hereinafter, referred to as "GC") operation on logical addresses selected by the garbage collection control block 1320, and transmit the generated host command Host_CMD along with the selected logical addresses to the controller 1200. When the number of logical addresses selected by the garbage collection control block 1320 is equal to or greater than a preset value, the host processor 1310 may generate a host command Host_CMD corresponding to a GC operation for the selected logical addresses. Furthermore, if information about logical addresses selected as urgent logical addresses by the garbage collection control block 1320 is received, the host processor 1310 may immediately generate a host command Host_CMD corresponding to a GC operation for the urgent logical addresses and output the host command Host_CMD along with the urgent logical addresses to the controller 1200. In other words, if at least one logical address selected as an urgent logical address is present, a host command Host_CMD corresponding to a GC operation may be immediately generated and output to the controller 1200.

The garbage collection control block 1320 may manage a read count value of each of a plurality of logical addresses, weight read count values of some logical addresses based on level information level_info received from the controller 1200, and update the read count values. The garbage collection control block 1320 may select logical addresses each having a read count value equal to or greater than a second preset value, and transmit information about the selected logical addresses to the host processor 1310. Furthermore, the garbage collection control block 1320 may select, as urgent logical addresses, logical addresses required for the GC operation to be immediately performed thereon based on the level information level_info, and transmit information about the urgent logical addresses to the host processor 1310.

The controller 1200 and the memory device 1100 may be integrated into a single semiconductor device. In an embodiment, the controller 1200 and the memory device 1100 may be integrated into a single semiconductor device to form a memory card. For example, the controller 1200 and the memory device 1100 may be integrated into a single semiconductor device and form a memory card such as a personal computer memory card international association (PCM-CIA), a compact flash card (CF), a smart media card (SM or SMC), a memory stick multimedia card (MMC, RS-MMC, or MMCmicro), a SD card (SD, miniSD, microSD, or SDHC), or a universal flash storage (UFS).

The controller 1200 and the memory device 1100 may be integrated into a single semiconductor device to form a solid state drive (SSD). The SSD may include a storage device configured to store data in a semiconductor memory 100.

In an embodiment, the memory system 1000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the memory device 1100 or the memory system 1000 may be embedded in various types of packages. For example, the memory device 1100 or the memory system 1000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

Figure 2:
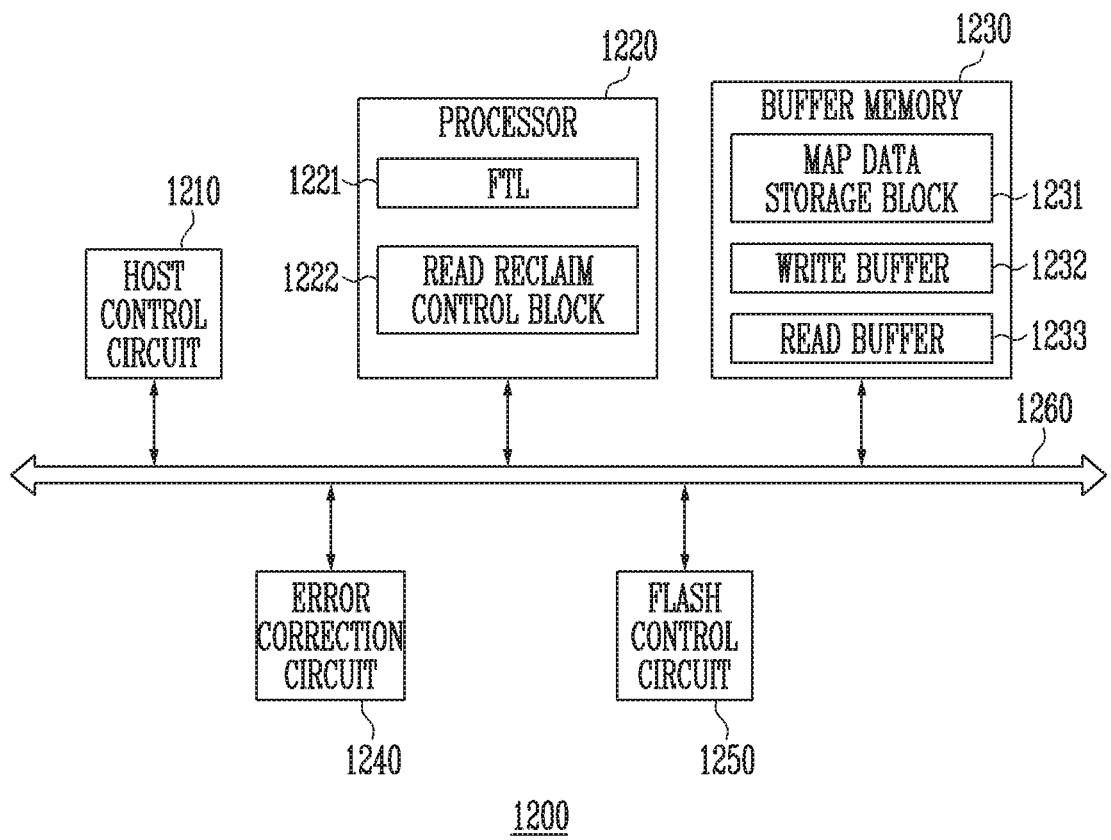
FIG. 2 is a block diagram illustrating the configuration of a controller of FIG. 1.

FIG. 2 is a block diagram illustrating the configuration of the controller 1200 of FIG. 1 in accordance with an embodiment of the present disclosure.

Referring to FIG. 2, the controller 1200 may include a host control circuit 1210, a processor 1220, a buffer memory 1230, an error correction circuit 1240, a flash control circuit 1250, and a bus 1260.

The bus 1260 may provide a channel between the components of the controller 1200.

The host control circuit 1210 may control data transmission between the host 1300 of FIG. 1 and the buffer memory 1230. For example, the host control circuit 1210 may control an operation of buffering data input from the host 1300 to the buffer memory 1230. In an embodiment, the host control circuit 1210 may control an operation of outputting data buffered in the buffer memory 1230 to the host 1300. Furthermore, the host control circuit 1210 may control an operation of outputting, to the host 1300, a command response signal and level information which are generated from the processor 1220.

The host control circuit 1210 may include a host interface.

The processor 1220 may control the overall operation of the controller 1200 and perform a logical operation. The processor 1220 may communicate with the host 1300 of FIG. 1 through the host control circuit 1210, and communicate with the memory device 1100 of FIG. 1 through the flash control circuit 1250. The processor 1220 may control the operation of the memory system 1000 by using the buffer memory 1230 as an operation memory, a cache memory, or a buffer. The processor 1220 may rearrange, based on priorities, a plurality of host commands received from the host 1300 and generate a command queue, and may control the flash control circuit 1250 based on the command queue. Furthermore, the processor 1220 may manage the respective read count values of the plurality of memory blocks included in the memory device 1100, and control the flash control circuit 1250 to perform an RRC operation on a memory block having a read count value equal to or greater than a first preset value (e.g., the read count threshold value of the RRC operation). In addition, the processor 1220 may generate, based on respective read count values of a plurality of memory blocks, level information of logical addresses corresponding to the plurality of memory blocks.

When a host command Host_CMD corresponding to a GC operation received from the host 1300, the processor 1220 may check physical addresses corresponding to logical addresses received along with the host command Host_CMD, and generate a command queue and control the flash control circuit 1250 to perform the GC operation on memory blocks corresponding to the checked physical addresses.

The processor 1220 may include a flash translation layer (hereinafter, referred to as "FTL") 1221, and a read reclaim control block 1222.

The FTL 1221 may be operated based on firmware. The firmware may be stored in the buffer memory 1230, an additional memory (not illustrated) directly coupled to the processor 1220, or a storage space defined in the processor 1220. During a write operation, the FTL 1221 may map a corresponding physical address to a logical address input from the host 1300 of FIG. 1. Furthermore, during a read operation, the FTL 1221 may check a physical address mapped to a logical address input from the host 1300. Here, a mapping operation may be performed based on map data stored in the buffer memory 1230. During an operation of generating level information after the rear operation, the FTL 1221 may check logical addresses corresponding to a related memory block, match level information with the checked logical addresses, and output the level information to the host 1300.

The FTL 1221 may generate a command queue for controlling the flash control circuit 1250 in response to a host command received from the host 1300.

After a read operation has been completed, the read reclaim control block 1222 may increase a read count of a memory block on which the read operation has been performed, and may control the flash control circuit 1250 to select, as a victim block, a memory block having a read count equal to or greater than the first preset value (e.g., the read count threshold value of the RRC operation) and perform a RRC operation on the selected memory block.

The read reclaim control block 1222 may generate level information including any one of a plurality of levels determined depending on the read count value of the memory block on which the read operation has been completed and the first preset value. For example, the level information may be generated as a first level when the read count value is less than 70% of the first preset value, a second level when the read count value is equal to or greater than 70% and less than 80% of the first preset value, a third level when the read count value is equal to or greater than 80% and less than 90% of the first preset value, and a fourth level when the read count value is equal to or greater than 90% of the first preset value.

The generated level information may be matched with logical addresses corresponding to a related memory block by the FTL 1221 and output to the host 1300.

The buffer memory 1230 may be used as an operation memory, a cache memory, or a buffer of the processor 1220. The buffer memory 1230 may store codes and commands to be executed by the processor 1220. The buffer memory 1230 may store data that is processed by the processor 1220. Furthermore, the buffer memory 1230 may store map data for a mapping operation to be performed in the processor 1220. The map data may be stored in the memory device (1100 of FIG. 1), and may be read during a power-on operation of the memory system 1000 and stored in the buffer memory 1230.

The buffer memory 1230 may include a map data storage block 1231, a write buffer 1232, and a read buffer 1233. The map data storage block 1231 may store map data. The write buffer 1232 may temporarily store data received from the host 1300 during a write operation, and then transmit the temporarily stored data to the memory device 1100. During a read operation, the read buffer 1233 may temporarily store data received from the memory device 1100, and then transmit the temporarily stored data to the host 1300.

The buffer memory 1230 may include a static RAM (SRAM) or a dynamic RAM (DRAM).

The error correction circuit 1240 may perform an error correction operation. The error correction circuit 1240 may perform an ECC (error correction code) encoding operation based on data to be written to the memory device 1100 of FIG. 1 through the flash control circuit 1250. ECC encoded data may be transmitted to the memory device 1100 through the flash control circuit 1250. The error correction circuit 1240 may perform an ECC decoding operation for data received from the memory device 1100 through the flash control circuit 1250. For example, the error correction circuit 1240 may be included in the flash control circuit 1250 as a component of the flash control circuit 1250.

In response to a command queue generated from the processor 1220 the flash control circuit 1250 may generate and output an internal command for controlling the memory device 1100. During a write operation, the flash control circuit 1250 may control an operation of transmitting and writing data buffered in the write buffer 1232 of the buffer memory 1230 to the memory device 1100. In an embodiment, during a read operation, the flash control circuit 1250 may control an operation of buffering, in the read buffer 1233 of the buffer memory 1230, data read from the memory device 1100 in response to a command queue.

During an RRC operation, the flash control circuit 1250 may control the memory device 1100 to copy data stored in a memory block selected as a victim block and store the copied data in a memory block selected as a target block. Thereafter, the victim block may be erased.

During a GC operation, the flash control circuit 1250 may control the memory device 1100 to copy valid data of a plurality of memory blocks selected as victim blocks and store the copied valid data in a memory block selected as a target block. Thereafter, the data stored in the plurality of memory blocks selected as victim blocks may be erased.

The flash control circuit 1250 may include a flash interface.

Figure 3:
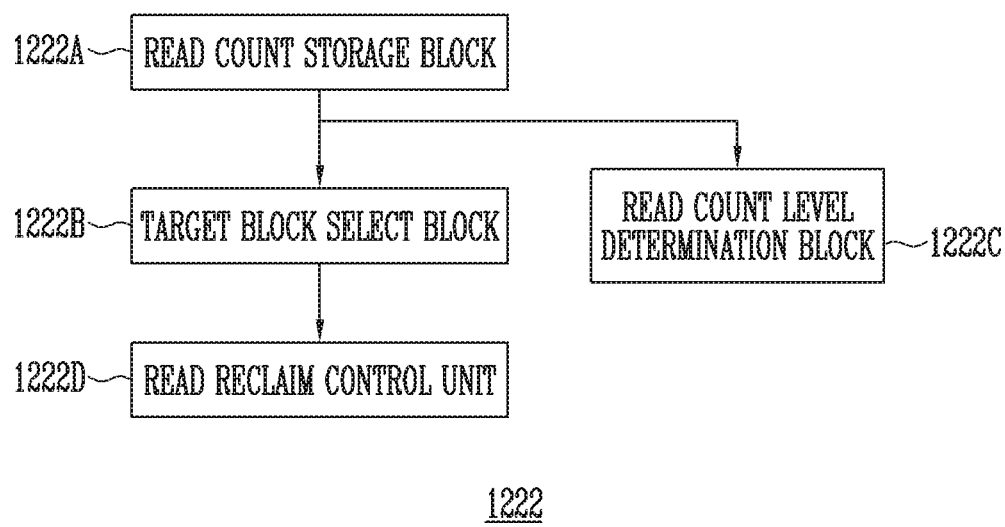
FIG. 3 is a block diagram illustrating a read reclaim control block of FIG. 2.

FIG. 3 is a block diagram illustrating the read reclaim control block 1222 of FIG. 2 in accordance with an embodiment of the present disclosure.

Referring to FIG. 3, the read reclaim control block 1222 may include a read count storage block 1222A, a target block select block 1222B, a read count level determination block 1222C, and a read reclaim control unit 1222D.

The read count storage block 1222A may store respective read count values of a plurality of memory blocks included in the memory device (1100 of FIG. 1), and manage the read count values in such a way that each time a read operation is completed, the read count value of the corresponding memory block is increased.

The target block select block 1222B may compare the read count value of a memory block on which a read operation has been completed with the first preset value, and select a memory block as a victim block when the read count value of the corresponding memory block is equal to or greater than the first preset value. During an RRC operation, the target block select block 1222B may select a target memory block to store data of a memory block selected as a victim block. The target block select block 1222B may select any one of memory blocks each having an erased status as the target memory block.

The rear count level determination block 1222C may determine a ratio of the read count value of the memory block, on which the read operation has been completed, with reference to the first preset value, and generate level information. For example, the read count level determination block 1222C may generate the level information as a first level when the read count value of the memory block on which the read operation has been completed is less than 70% of the first preset value, a second level when the read count value is equal to or greater than 70% and less than 80% of the first preset value, a third level when the read count value is equal to or greater than 80% and less than 90% of the first preset value, and a fourth level when the read count value is equal to or greater than 90% of the first preset value. The generated level information may be matched with the logical addresses corresponding to the related memory block by the FTL (1221 of FIG. 2) and output to the host 1300.

If the victim block and the target block are selected by the target block select block 1222B, the read reclaim control unit 1222D may control the flash control circuit (1250 of FIG. 2) to perform an RRC operation on the victim block.

Figure 4:
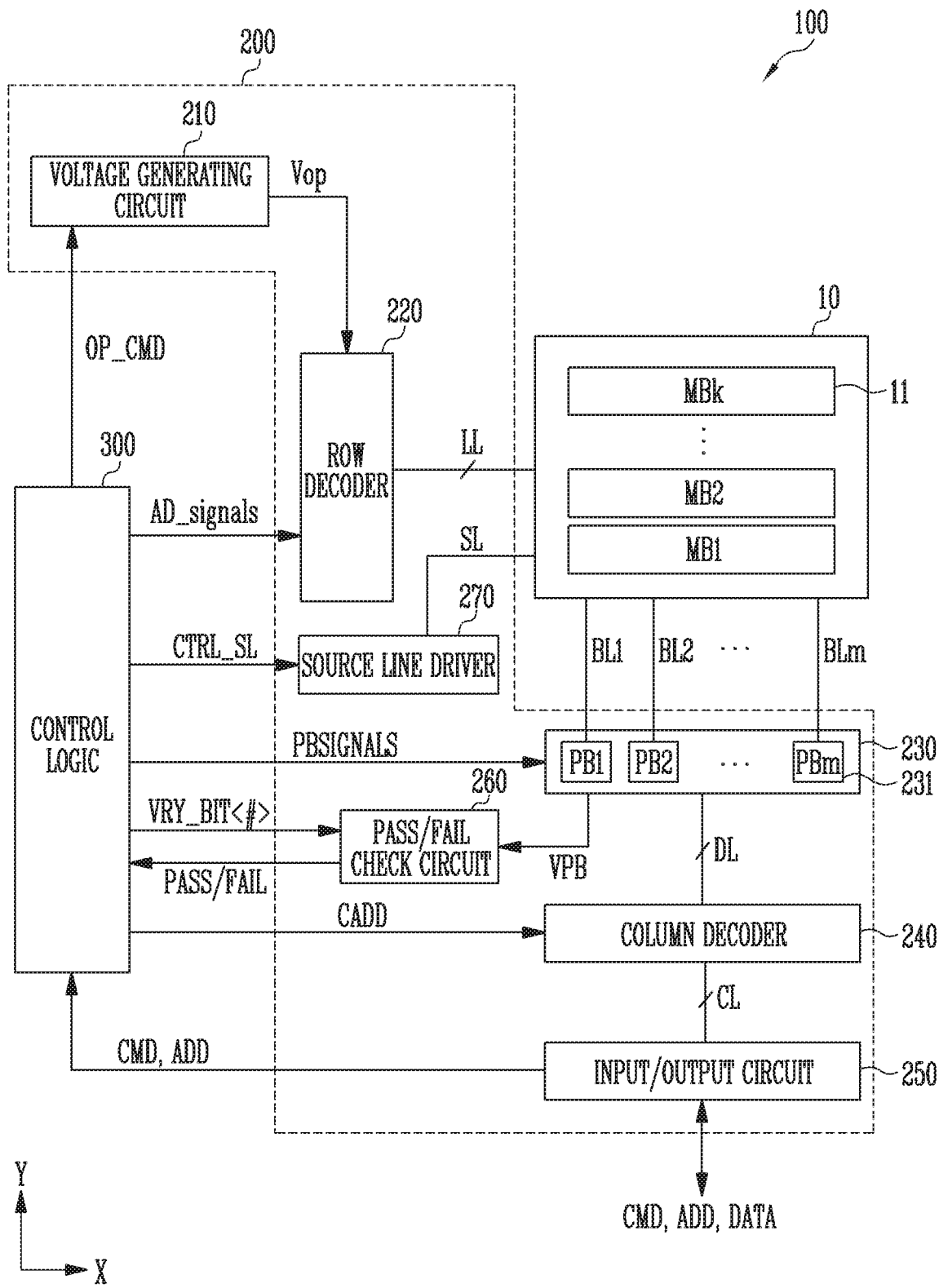
FIG. 4 is a diagram describing a semiconductor memory of FIG. 1.

FIG. 4 is a diagram describing the semiconductor memory 100 of FIG. 1.

Referring to FIG. 4, the semiconductor memory 100 may include a memory cell array 10 configured to store data. The semiconductor memory 100 may include peripheral circuits 200 configured to perform a program operation for storing data in the memory cell array 10, a read operation for outputting the stored data, and an erase operation for erasing the stored data. The semiconductor memory 100 may include a control logic 300 configured to control the peripheral circuits 200 under control of the controller (1200 of FIG. 1).

The memory cell array 10 may include a plurality of memory blocks MB1 to MBk (11) where k is a positive integer. Local lines LL and bit lines BL1 to BLm (m is a positive integer) may be coupled to each of the memory blocks MB1 to MBk (11). For example, the local lines LL may include a first select line, a second select line, and a plurality of word lines arranged between the first and the second select lines. The local lines LL may include dummy lines arranged between the first select line and the word lines, and between the second select line and the word lines. Here, the first select line may be a source select line, and the second select line may be a drain select line. For example, the local lines LL may include word lines, drain and source select lines, and source lines SL. For example, the local lines LL may further include dummy lines. For example, the local lines LL may further include pipelines. The local lines LL may be coupled to each of the memory blocks MB1 to MBk (11). The bit lines BL1 to BLm may be coupled in common to the memory blocks MB1 to MBk (11). The memory blocks MB1 to MBk (11) may be embodied in a two- or three-dimensional structure. For example, in the memory blocks 11 having a two-dimensional structure, the memory cells may be arranged in a direction parallel to a substrate. For example, in the memory blocks 11 having a three-dimensional structure, the memory cells may be stacked in a direction perpendicular to the substrate.

At least one memory block (e.g., MB1) of the memory blocks MB1 to MBk (11) may be defined as a system memory block, and map data may be stored in the system memory block.

The peripheral circuits 200 may perform a program operation, a read operation, or an erase operation on a selected memory block 11 under control of the control logic 300. For instance, the peripheral circuits 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop to be used for a program operation, a read operation, and an erase operation in response to an operating signal OP_CMD. Furthermore, the voltage generating circuit 210 may selectively discharge the local lines LL in response to an operating signal OP_CMD. For example, the voltage generating circuit 210 may generate a program voltage, a verify voltage, a pass voltage, and a select transistor operating voltage under control of the control logic 300.

The row decoder 220 may transmit operating voltages Vop to local lines LL coupled to a selected memory block 11 in response to control signals AD_signals. For example, the row decoder 220 may selectively apply operating voltages (e.g., a program voltage, a verify voltage, and a pass voltage) generated from the voltage generating circuit 210 to the word lines among the local lines LL in response to row decoder control signals AD_signals.

During a program voltage applying operation, in response to the control signals AD_signals, the row decoder 220 may apply a program voltage generated by the voltage generating circuit 210 to a selected word line of the local lines LL, and apply a pass voltage generated by the voltage generating circuit 210 to the other unselected word lines. During a read operation, in response to the control signals AD_signals, the row decoder 220 may apply a read voltage generated by the voltage generating circuit 210 to a selected word line of the local lines LL, and apply a pass voltage generated by the voltage generating circuit 210 to the other unselected word lines.

The page buffer group 230 may include a plurality of page buffers PB1 to PBm (231) coupled to the bit lines BL1 to BLm. The page buffers PB1 to PBm (231) may operate in response to page buffer control signals PBSIGNALS. For instance, the page buffers PB1 to PBm (231) may temporarily store data to be programmed during a program operation, or sense voltages or currents of the bit lines BL1 to BLm during a read or verify operation.

In response to a column address CADD, the column decoder 240 may transmit data between the input/output circuit 250 and the page buffer group 230. For example, the column decoder 240 may exchange data with the page buffers 231 through data lines DL or exchange data with the input/output circuit 250 through column lines CL.

The input/output circuit 250 may transmit an internal command CMD or an address ADD received from the controller (1200 of FIG. 1) to the control logic 300, or exchange data with the column decoder 240. The address ADD may be an address mapped with a physical address.

During a read operation or a verify operation, the pass/fail check circuit 260 may generate a reference current in response to an enable bit VRY_BIT<#>, and may compare a sensing voltage VPB received from the page buffer group 230 with a reference voltage generated by the reference current and output a pass signal PASS or a fail signal FAIL.

The source line driver 270 may be coupled, through the source line SL, to the memory cells included in the memory cell array 10, and may control a voltage to be applied to the source line SL. The source line driver 270 may receive a source line control signal CTRL_SL from the control logic 300, and control a source line voltage to be applied to the source line SL based on the source line control signal CTRL_SL.

In response to an internal command CMD and an address ADD, the control logic 300 may control the peripheral circuits 200 by outputting an operating signal OP_CMD, control signals AD_signals, the source line control signal CTRL_SL, page buffer control signals PBSIGNALS, and an enable bit VRY_BIT<#>, and the column address CADD. Additionally, in response to a pass signal PASS or a fail signal FAIL, the control logic 300 may determine whether a target memory cell has passed a verification during a verify operation.

Figure 5:
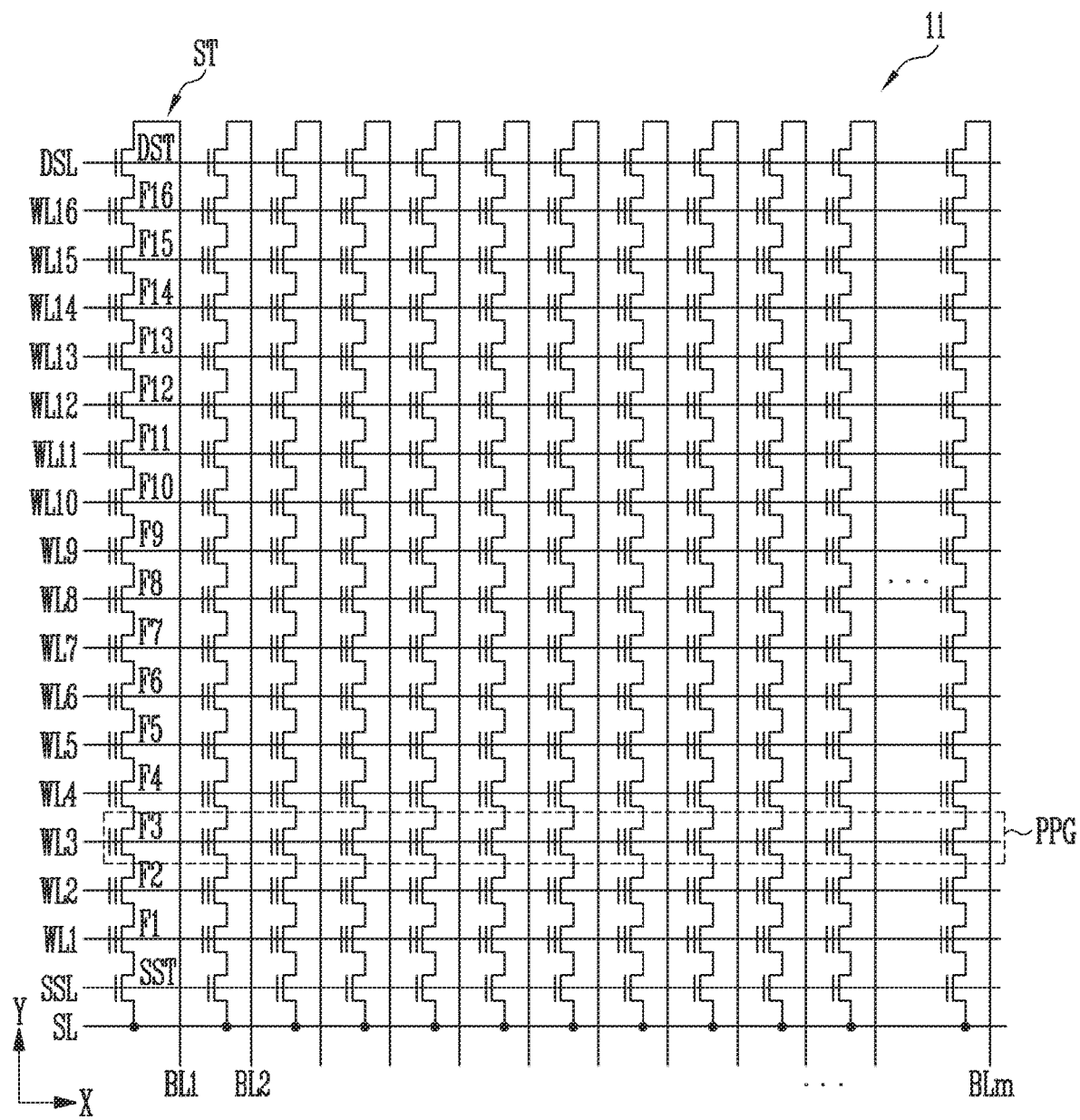
FIG. 5 is a diagram illustrating a memory block of FIG. 4.

FIG. 5 is a diagram illustrating the memory block 11 of FIG. 4.

Referring to FIG. 5, in the memory block 11, a plurality of word lines arranged parallel to each other may be coupled between a first select line and a second select line. Here, the first select line may be a source select line SSL, and the second select line may be a drain select line DSL. In more detail, the memory block 11 may include a plurality of strings ST coupled between the bit lines BL1 to BLm and the source line SL. The bit lines BL1 to BLm may be respectively coupled to the strings ST, and the source line SL may be coupled in common to the strings ST. The strings ST may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to the plurality of word lines WL1 to WL16. Among the memory cells included in different strings ST, a group of memory cells coupled to each word line may be referred to as a physical page PPG. Therefore, the number of physical pages PPG included in the memory block 11 may correspond to the number of word lines WL1 to WL16.

Each memory cell may store 1-bit data. This memory cell is typically called a single level cell (SLC). In this case, each physical page PPG may store data of a singe logical page LPG. Data of each logical page LPG may include data bits corresponding to the number of cells included in a single physical page PPG. Each memory cell may store 2- or more-bit data. This memory cell is typically called a multi-level cell (MLC). In this case, each physical page PPG may store data of two or more logical pages LPG.

Figure 6:
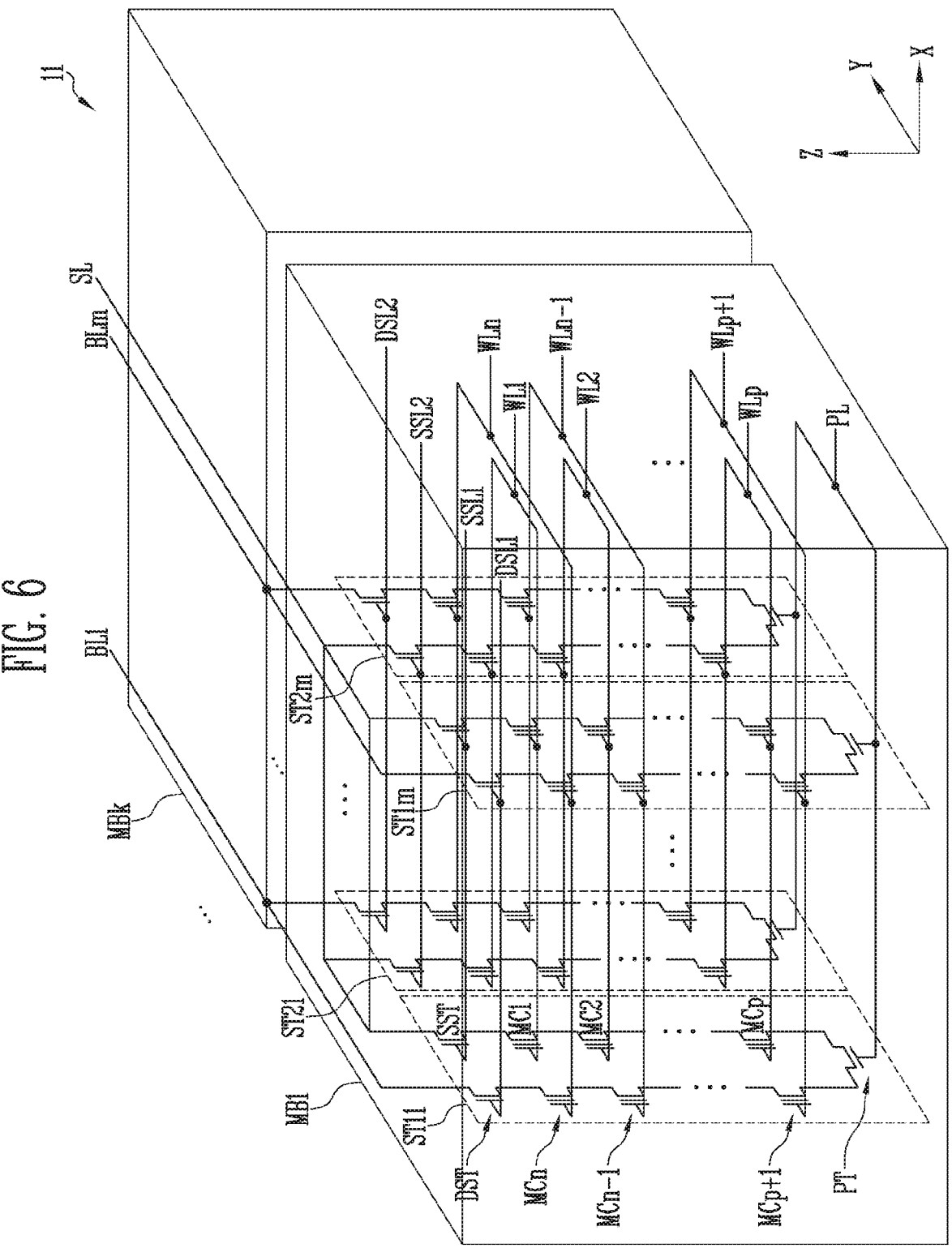
FIG. 6 is a diagram illustrating a memory block having a three-dimensional structure in accordance with an embodiment of the present disclosure.

FIG. 6 is a diagram illustrating an example of a memory block having a three-dimensional structure in accordance with an embodiment of the present disclosure.

Referring to FIG. 6, the memory cell array 10 may include a plurality of memory blocks MB1 to MBk (11). Each memory block 11 may include a plurality of strings ST11 to ST1*m* and ST21 to ST2*m*. In an embodiment, each of the strings ST11 to ST1*m* and ST21 to ST2*m* may be formed in a 'U' shape. In the first memory block MB1, m strings may be arranged in a row direction (i.e. an X direction). FIG. 6 illustrates that two strings are arranged in a column direction (i.e., a Y direction), but this is only for the sake of description. For example, three or more strings may be arranged in the column direction (the Y direction).

Each of the plurality of strings ST11 to ST1*m* and ST21 to ST2*m* may include at least one source select transistor SST, first to n-th memory cells MC1 to MCn, a pipe transistor PT, and at least one drain select transistor DST.

The source select transistor SST, the drain select transistor DST, and the memory cells MC1 to MCn may have structures similar to each other. For example, each of the source select transistor SST, the drain select transistor DST, and the memory cells MC1 to MCn may include a channel layer, a tunnel insulating layer, a charge trap layer, and a blocking insulating layer. For example, a pillar for providing the channel layer may be provided in each string. For instance, a pillar for providing at least one of the channel layer, the tunnel insulating layer, the charge trap layer, and the blocking insulating layer may be provided in each string.

The source select transistor SST of each string may be coupled between the source line SL and the memory cells MC1 to MCn.

In an embodiment, source select transistors of strings arranged in the same row may be coupled to a source select line extending in the row direction. Source select transistors of strings arranged in different rows may be coupled to different source select lines. In FIG. 6, source select transistors of the strings ST11 to ST1*m* in a first row may be coupled to a first source select line SSL1. Source select transistors of the strings ST21 to ST2*m* in a second row may be coupled to a second source select line SSL2.

In an embodiment, the source select transistors of the strings ST11 to ST1*m* and ST21 to ST2*m* may be coupled in common to a single source select line.

The first to n-th memory cells MC1 to MCn in each string may be coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp may be successively arranged in a vertical direction (i.e., in a Z direction) and coupled in series to each other between the source select transistor SST and the pipe transistor PT. The p+1-th to n-th memory cells MCCp+1 to MCn may be successively arranged in the vertical direction (the Z direction) and coupled in series to each other between the pipe transistor PT and the drain select transistor DST. The first to p-th memory cells MC1 to MCp and the p+1-th to n-th memory cells MCp+1 to MCn may be coupled to each other through the pipe transistor PT. Gates of the first to n-th memory cells MC1 to MCn of each string may be respectively coupled to first to n-th word lines WL1 to WLn.

In an embodiment, at least one of the first to n-th memory cells MC1 to MCn may be used as a dummy memory cell. In the case where the dummy memory cell is provided, the voltage or the current of the corresponding string may be stably controlled. Gates of the pipe transistors PT of the respective strings may be coupled to a pipeline PL.

The drain select transistor DST of each string may be coupled between the corresponding bit line and the memory cells MCp+1 to MCn. Strings arranged in the row direction may be coupled to corresponding drain select lines extending in the row direction. The drain select transistors of the strings ST11 to ST1$m$ in the first row may be coupled to a first drain select line DSL1. The drain select transistors of the strings ST21 to ST2$m$ in the second row may be coupled to a second drain select line DSL2.

Strings arranged in the column direction may be coupled to corresponding bit lines extending in the column direction. In FIG. 6, the strings ST11 and ST21 in a first column may be coupled to a first bit line BL1. The strings ST1$m$ and ST2$m$ in an m-th column may be coupled to an m-th bit line BLm.

Among the strings arranged in the row direction, memory cells coupled to the same word line may form one page. For example, memory cells coupled to the first word line WL1 in the strings ST11 to ST1$m$ of the first row may form a single page. Memory cells coupled to the first word line WL1 in the strings ST21 to ST2$m$ of the second row may form another single page. When any one of the drain select lines DSL1 and DSL2 is selected, strings arranged in the corresponding row may be selected. When any one of the word lines WL1 to WLn is selected, a corresponding single page may be selected from the selected strings.

Figure 7:
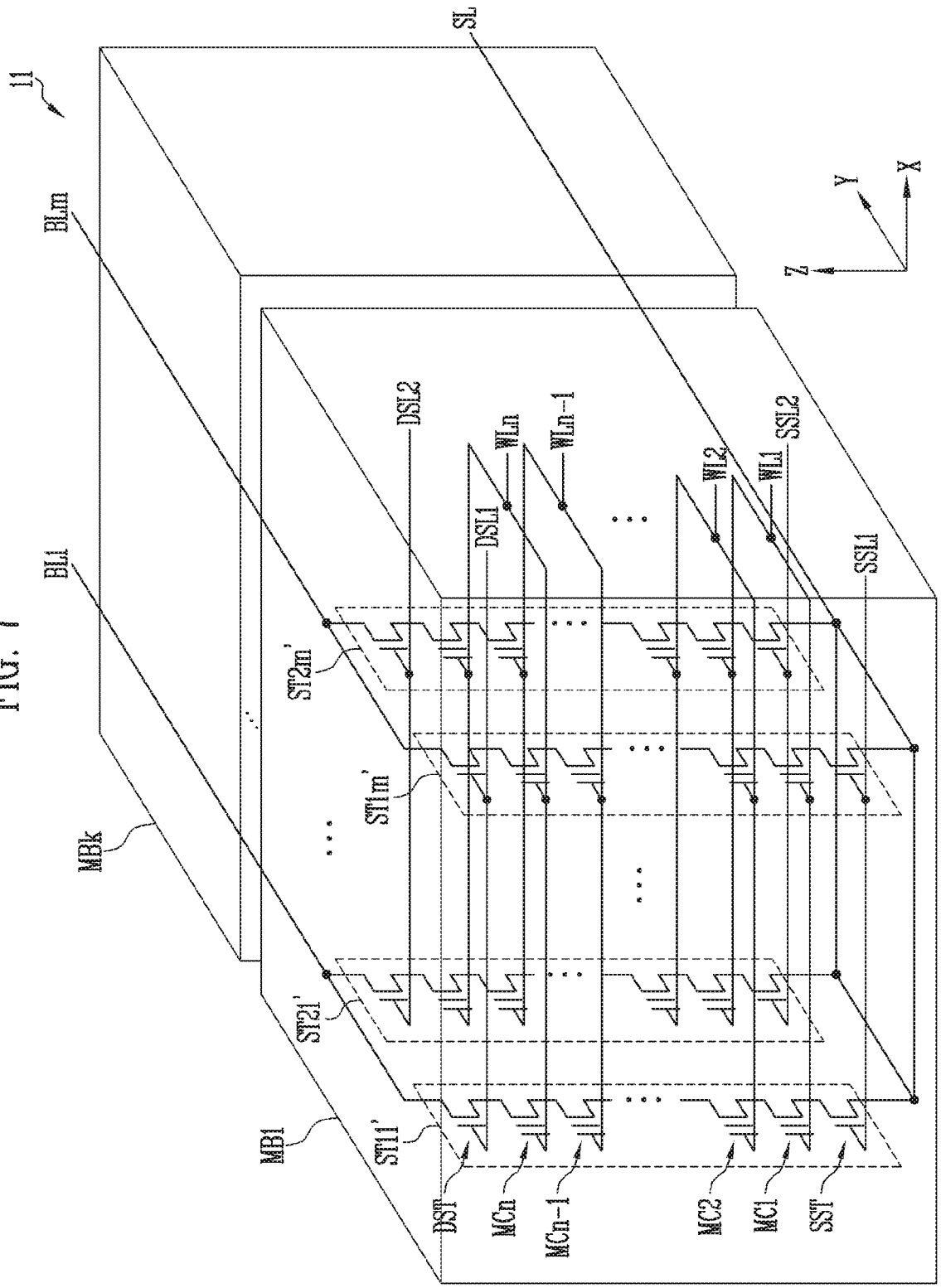
FIG. 7 is a diagram illustrating a memory block having a three-dimensional structure in accordance with an embodiment of the present disclosure.

FIG. 7 is a diagram illustrating an example of a memory block having a three-dimensional structure in accordance with an embodiment of the present disclosure.

Referring to FIG. 7, the memory cell array 10 may include a plurality of memory blocks MB1 to MBk (11). Each memory block 11 may include a plurality of strings ST11' to ST1$m$' and ST21' to ST2$m$'. Each of the strings ST11' to ST1$m$' and ST21' to ST2$m$' may extend in a vertical direction (i.e., in a Z direction). In each memory block 11, m strings may be arranged in a row direction (i.e., in an X direction). FIG. 7 illustrates that two strings are arranged in a column direction (i.e., in a Y direction), but this is only for the sake of description. For example, three or more strings may be arranged in the column direction (the Y direction).

Each of the strings ST11' to ST1$m$' and ST21' to ST2$m$' may include at least one source select transistor SST, first to n-th memory cells MC1 to MCn, and at least one drain select transistor DST.

The source select transistor SST of each string may be coupled between the source line SL and the memory cells MC1 to MCn. Source select transistors of strings arranged in the same row may be coupled to the same source select line. The source select transistors of the strings ST11' to ST1$m$' arranged in a first row may be coupled to a first source select line SSL1. The source select transistors of the strings ST21' to ST2$m$' arranged in a second row may be coupled to a second source select line SSL2. In an embodiment, the source select transistors of the strings ST11' to ST1$m$' and ST21' to ST2$m$' may be coupled in common to a single source select line.

The first to n-th memory cells MC1 to MCn in each string may be coupled in series between the source select transistor SST and the drain select transistor DST. Gates of the first to n-th memory cells MC1 to MCn may be respectively coupled to first to n-th word lines WL1 to WLn.

In an embodiment, at least one of the first to n-th memory cells MC1 to MCn may be used as a dummy memory cell. In the case where the dummy memory cell is provided, the voltage or the current of the corresponding string may be stably controlled. Thereby, the reliability of data stored in each memory block 11 may be improved.

The drain select transistor DST of each string may be coupled between the corresponding bit line and the memory cells MC1 to MCn. Drain select transistors DST of strings arranged in the row direction may be coupled to corresponding drain select lines extending in the row direction. The drain select transistors DST of the strings ST11 to ST1$m$' in the first row may be coupled to a first drain select line DSL1. The drain select transistors DST of the strings ST21' to ST2$m$' in the second row may be coupled to a second drain select line DSL2.

Figure 8:
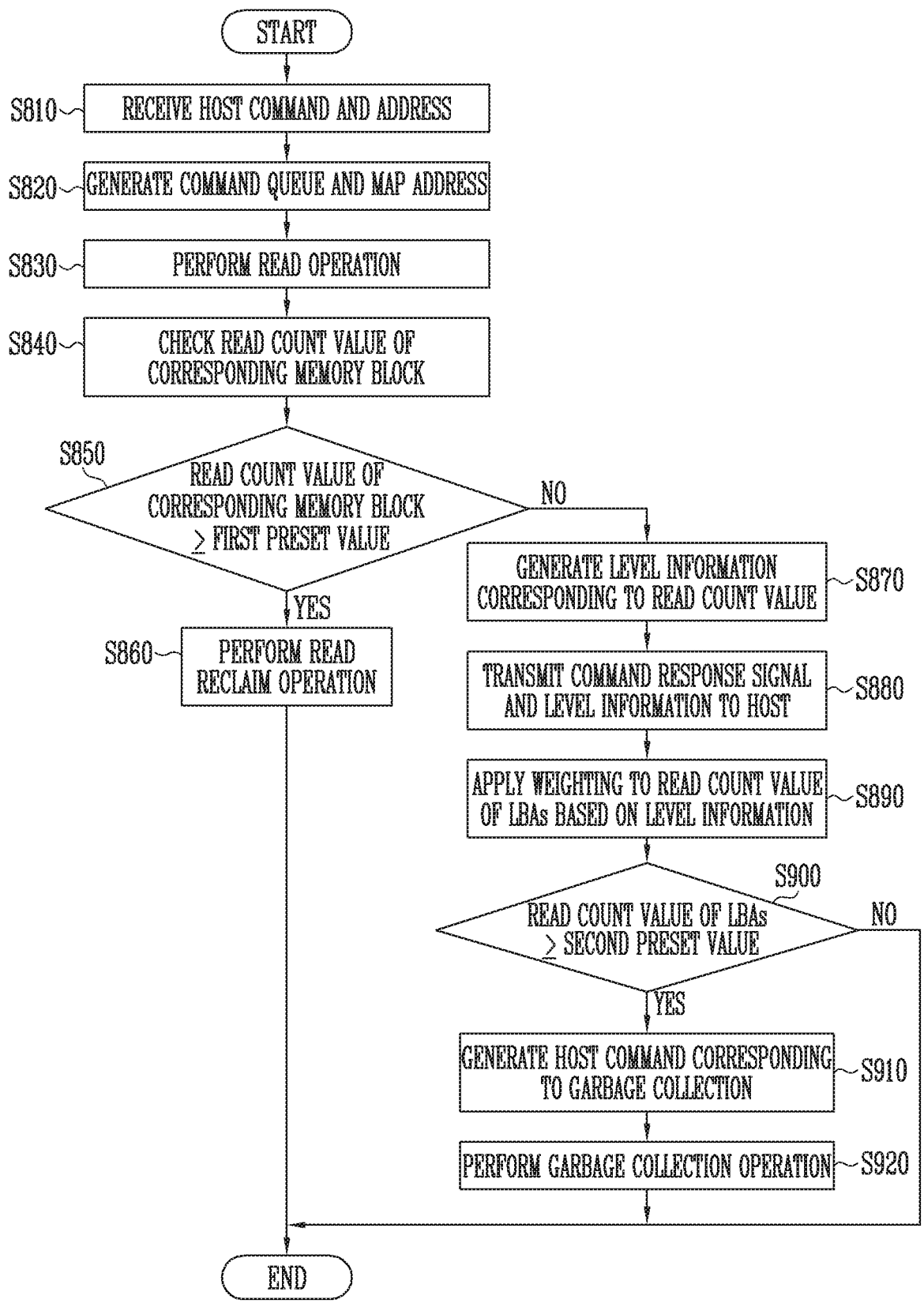
FIG. 8 is a flowchart illustrating the operation of the memory system in accordance with an embodiment of the present disclosure.

FIG. 8 is a flowchart of a method of operating the memory system in accordance with an embodiment of the present disclosure.

A method of operating the memory system in accordance with an embodiment of the present disclosure will be described with reference to FIGS. 1 to 8.

Corresponding to a read operation, a host command Host_CMD and a logical address are received from the host 1300, at step S810.

The processor 1220 of the controller 1200 generates a command queue in response to the host command Host_CMD and maps a logical address to a physical address, at step S820.

In response to the command queue, the flash control circuit 1250 generates an internal command CMD for controlling the memory device 1100, and transmits the internal command CMD and the mapped address ADD to a selected semiconductor memory 100 of the memory device 1100.

At step S830, in response to the internal command CMD and the mapped address ADD the selected semiconductor memory 100 performs a read operation on a selected memory block (e.g., MB1) of the plurality of memory blocks 11. Data read from the selected semiconductor memory 100 is temporarily stored in the read buffer 1233 of the controller 1200.

Subsequently, the read count storage block 1222A of the read reclaim control block 1222 increases the read count value of the memory block MB1 of the semiconductor memory 100 by 1, on which the read operation has been performed, and checks the read count value of the memory block MB1, at step S840.

The target block select block 1222B compares the read count value of the memory block MB1, on which the read operation has been performed, with the first preset value, at step S850.

If a result of the comparison operation (S850) indicates that the read count value of the memory block MB1 on which the read operation has been performed is equal to or greater than the first setting value (YES), the read reclaim control block 1222 controls the flash control circuit 1250 to perform the read reclaim operation on the memory block MB1.

For example, the target block select block 1222B selects the memory block MB1 as a victim block to perform an RRC operation, and selects, as a target memory block, a memory block having an erased status among the plurality of memory blocks included in the selected semiconductor memory 100 of the memory device 1100. The read reclaim control unit 1222D controls the flash control circuit 1250 to perform the RRC operation, and the flash control circuit 1250 controls the memory device 1100 to copy data stored in the victim block and store the data in the target memory block, thus performing the RRC operation, at step S860.

Before the RRC operation is performed or after the RRC operation is performed, the read data that is temporarily stored in the read buffer 1233 may be transmitted to the host 1300. Thereafter, a command response signal CMD_response for the host command Host_CMD may be transmitted to the host 1300. In response to the command response signal CMD_response the garbage collection control block 1320 of the host 1300 increases a read count value corresponding to a logical address on which the read operation has been completed.

If the result of the comparison operation (S850) indicates that the read count value of the memory block MB1 on which the read operation has been performed is less than the first preset value (NO), the read count level determination block 1222C of the read reclaim control block 1222 determines a ratio of the read count value of the memory block MB1 with reference to the first preset value, and generates level information level_info, at step S870. For example, the read count level determination block 1222C may generate the level information as a first level when the read count value of the memory block MB1 on which the read operation has been completed is less than 70% of the first preset value, a second level when the read count value is equal to or greater than 70% and less than 80% of the first preset value, a third level when the read count value is equal to or greater than 80% and less than 90% of the first preset value, and a fourth level when the read count value is equal to or greater than 90% of the first preset value.

The generated level information level_info is matched with logical addresses corresponding to the memory block MB1 by the FTL (1221 of FIG. 2), and the matched level information level_info is output to the host 1300 along with the command response signal CMD_response relative to the host command Host_CMD, at step S880.

The garbage collection control block 1320 of the host 1300 increases, in response to the command response signal CMD_response, the read count value corresponding to each of the logical addresses LBAs on which the read operation has been completed, and additionally weights, in response to the level information level_info, the read count value of each of the logical addresses LBAs corresponding to the corresponding memory block MB1, at step S890.

For example, when the level information level_info is the first level, the logical addresses LBAs corresponding to the related memory block MB1 is not weighted. When the level information level_info is the second level, the logical addresses LBAs corresponding to the related memory block MB1 is weighted. Furthermore, when the level information level_info is a third level, the logical addresses LBAs corresponding to the related memory block MB1 are selected as logical addresses on which the GC operation is to be performed, and information about the addresses is transmitted to the host processor 1310. In addition, when the level information level_info is a fourth level, the logical addresses LBAs corresponding to the related memory block MB1 are selected as urgent logical addresses required for the GC operation to be immediately performed thereon, and information about the addresses and urgency is transmitted to the host processor 1310.

The garbage collection control block 1320 compares the read count value of each of all logical addresses LBAs with the second preset value, at step S900.

If a result of the comparison operation (S900) indicates that the read count value of a logical address is equal to or greater than the second preset value (YES), the corresponding logical address is determined as a logical address on which a GC operation is to be performed, and information about the address is transmitted to the host processor 1310.

If the result of the comparison operation (S900) indicates that the read count value of a logical address is less than the second preset value (NO), the corresponding logical address is determined to be a logical address on which the GC operation is not to be performed.

When the number of logical addresses selected as the subjects of the GC operation by the garbage collection control block 1320 is equal to or greater than a preset value, the host processor 1310 may generate a host command Host_CMD corresponding to a GC operation for the selected logical addresses, at step S910. Furthermore, if information about logical addresses selected as urgent logical addresses for the immediate GC operation by the garbage collection control block 1320 is received, the host processor 1310 may immediately generate a host command Host_CMD corresponding to a GC operation for the urgent logical addresses and output the host command Host_CMD along with the urgent logical addresses to the controller 1200.

In response to the host command Host_CMD that is received from the host 1300 which corresponds to the GC operation, the processor 1220 of the controller 1200 generates a command queue corresponding to the GC operation. The processor 1220 may check physical addresses corresponding to the logical addresses received along with the host command Host_CMD, and control the flash control circuit 1250 to select memory blocks indicated by the checked physical addresses as victim blocks and perform the GC operation on the selected memory blocks. Under control of the flash control circuit 1250, the memory device 1100 performs the GC operation by copying valid data stored in the memory blocks selected as the victim blocks and storing the valid data in a memory block selected as a target block, at step S920.

Thereafter, the data stored in the plurality of memory blocks selected as the victim blocks may be erased.

In various embodiments of the present disclosure, under control of the controller 1200, a read reclaim operation is performed based on a read count value of a memory block on which a read operation has been performed. For a garbage collection operation which is performed under control of the host 1300, the read count value of each of the logical addresses is weighted based on the read count value of the memory block, and a logical address on which a GC operation is to be performed is selected. Therefore, the garbage collection operation is performed before the read reclaim operation of the corresponding memory block is performed, whereby the read reclaim operation may not be performed on a memory device, to which the garbage collection operation is performed.

Figure 9:
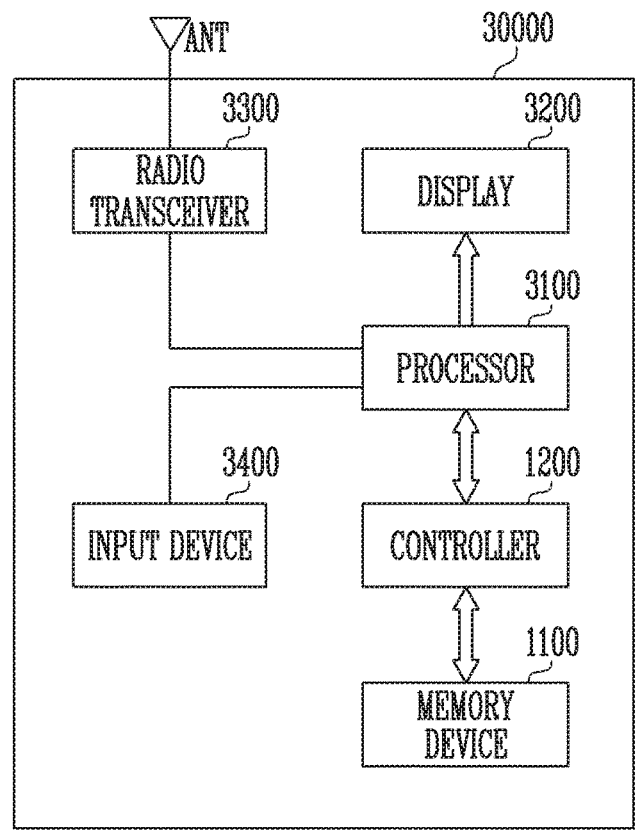
FIG. 9 is a diagram illustrating a memory system in accordance with an embodiment of the present disclosure.

FIG. 9 is a diagram illustrating a memory system 30000 in accordance with an embodiment of the present disclosure.

Referring to FIG. 9, the memory system 30000 may be embodied in a cellular phone, a smartphone, a tablet PC, a personal digital assistant (PDA) or a wireless communication device. The memory system 30000 may include a memory device 1100, and a controller 1200 capable of controlling the operation of the memory device 1100. The controller 1200 may control a data access operation, e.g., a program operation, an erase operation, or a read operation, of the memory device 1100 under control of a processor 3100.

Data programmed to the memory device 1100 may be output through a display 3200 under control of the controller 1200.

A radio transceiver 3300 may send and receive radio signals through an antenna ANT. For example, the radio transceiver 3300 may change a radio signal received through the antenna ANT into a signal capable of being processed in the processor 3100. Therefore, the processor 3100 may process a signal output from the radio transceiver 3300 and transmit the processed signal to the controller 1200 or the display 3200. The controller 1200 may program a signal processed by the processor 3100 to the memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad, a computer mouse, a keypad or a keyboard. The processor 3100 may control the operation of the display 3200 such that data output from the memory controller 1200, data output from the radio transceiver 3300, or data output form the input device 3400 is output through the display 3200.

In an embodiment, the controller 1200 capable of controlling the operation of the memory device 1100 may be embodied as a part of the processor 3100 or a chip provided separately from the processor 3100. Alternatively, the controller 1200 may be embodied by an example of the controller shown in FIG. 2.

Figure 10:
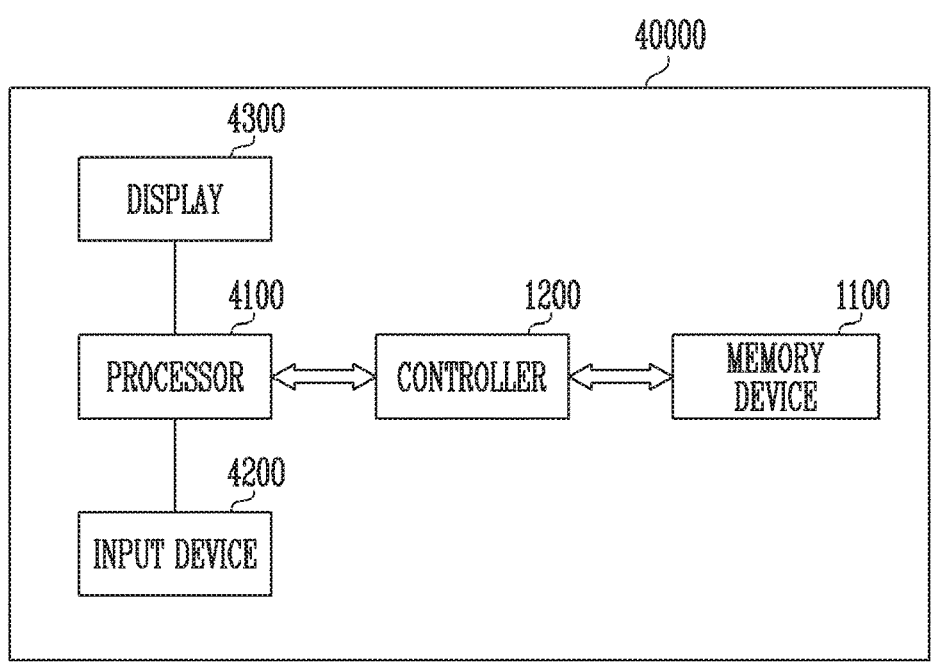
FIG. 10 is a diagram illustrating a memory system in accordance with an embodiment of the present disclosure.

FIG. 10 is a diagram illustrating a memory system 40000 in accordance with an embodiment of the present disclosure.

Referring to FIG. 10, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 1100, and a controller 1200 capable of controlling a data processing operation of the memory device 1100.

A processor 4100 may output data stored in the memory device 1100 through a display 4300, according to data input from an input device 4200. For example, the input device 4200 may be embodied in a pointing device such as a touch pad, a computer mouse, a keypad, or a keyboard.

The processor 4100 may control the overall operation of the memory system 40000 and control the operation of the controller 1200. In an embodiment, the controller 1200 capable of controlling the operation of the memory device 1100 may be embodied as a part of the processor 4100 or a chip provided separately from the processor 4100. Alternatively, the controller 1200 may be embodied by an example of the controller shown in FIG. 2.

Figure 11:
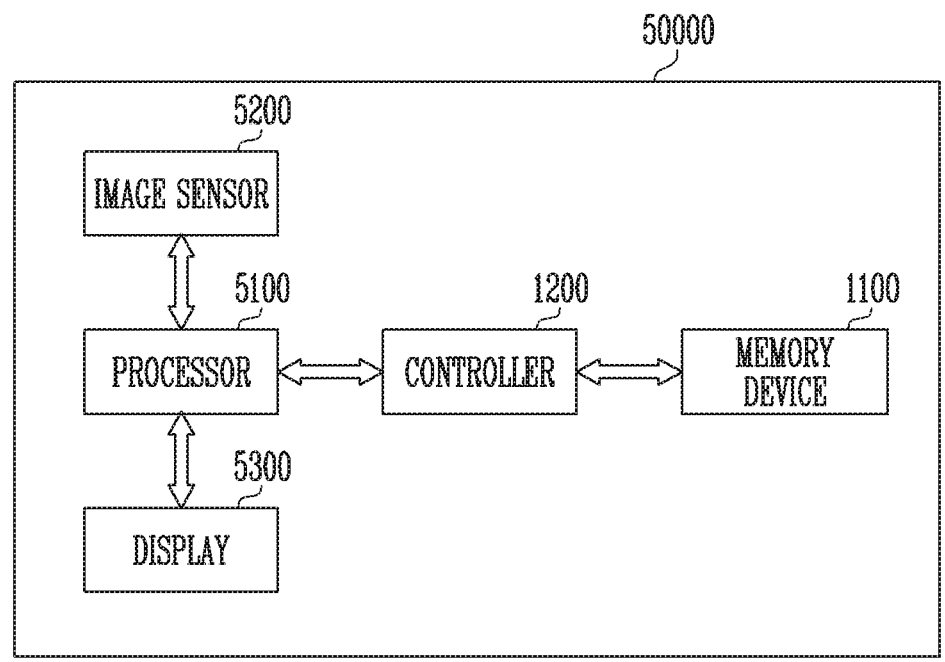
FIG. 11 is a diagram illustrating a memory system in accordance with an embodiment of the present disclosure.

FIG. 11 is a diagram illustrating a memory system 50000 in accordance with an embodiment of the present disclosure.

Referring to FIG. 11, the memory system 50000 may be embodied in an image processing device, e.g., a digital camera, a portable phone provided with a digital camera, a smartphone provided with a digital camera, or a tablet PC provided with a digital camera.

The memory system 50000 may include a memory device 1100, and a controller 1200 capable of controlling a data processing operation, e.g., a program operation, an erase operation, or a read operation, of the memory device 1100.

An image sensor 5200 of the memory system 50000 may convert an optical image into digital signals. The converted digital signals may be transmitted to a processor 5100 or the controller 1200. Under control of the processor 5100, the converted digital signals may be output through a display 5300 or stored to the memory device 1100 through the controller 1200. Data stored in the memory device 1100 may be output through the display 5300 under control of the processor 5100 or the controller 1200.

In an embodiment, the controller 1200 capable of controlling the operation of the memory device 1100 may be embodied as a part of the processor 5100 or a chip provided separately from the processor 5100. Alternatively, the controller 1200 may be embodied by an example of the controller shown in FIG. 2.

Figure 12:
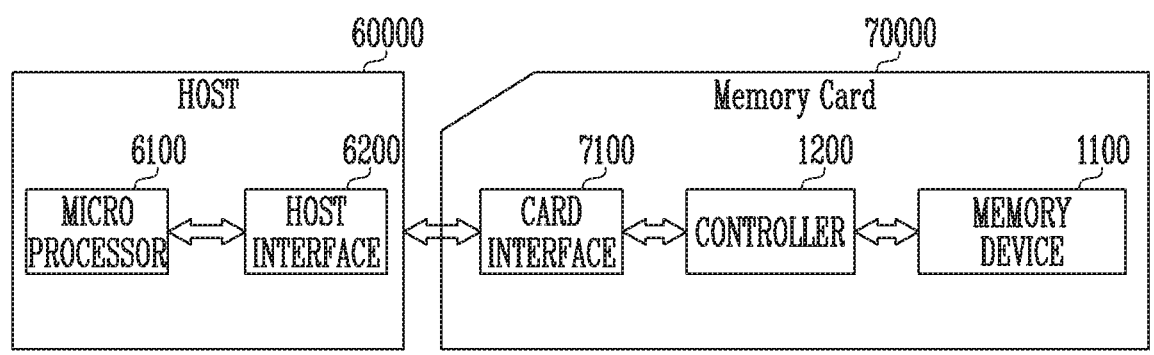
FIG. 12 is a diagram illustrating a memory system in accordance with an embodiment of the present disclosure.

FIG. 12 is a diagram illustrating a memory system 70000 in accordance with an embodiment of the present disclosure.

Referring to FIG. 12, the memory system 70000 may be embodied in a memory card or a smart card. The memory system 70000 may include a memory device 1100, a controller 1200, and a card interface 7100.

The memory controller 1200 may control data exchange between the memory device 1100 and the card interface 7100. In an embodiment, the card interface 7100 may be a secure digital (SD) card interface or a multi-media card (MMC) interface, but it is not limited thereto. The controller 1200 may be embodied by an example of the controller 1200 shown in FIG. 2.

The card interface 7100 may interface data exchanged between a host 60000 and the controller 1200 according to a protocol of the host 60000. In an embodiment, the card interface 7100 may support a universal serial bus (USB) protocol, and an interchip (IC)-USB protocol. Here, the card interface may refer to hardware capable of supporting a protocol which is used by the host 60000, software installed in the hardware, or a signal transmission scheme.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the controller 1200 under control of a microprocessor 6100.

As described above, in various embodiments of the present disclosure, a read reclaim operation is performed based on a read count value of a memory block on which a read operation has been. Logical addresses on which a garbage collection operation is to be performed are selected based on a read count value of a memory block and a read count value of each of logical addresses. Consequently, the read reclaim operation and the garbage collection operation may be prevented from overlapping with each other.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not be always performed in regular order. Furthermore, the embodiments disclosed in the present specification and the drawings aim to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory system comprising:
a memory device including a plurality of memory blocks;
a controller configured to manage a read count value of each of the memory blocks and generate level information corresponding to the read count value; and
a host configured to output a host command for requesting a garbage collection operation of the memory device based on the level information,
wherein the level information is a ratio of the read count value with reference to a read count threshold value of a read reclaim operation.

2. The memory system according to claim 1,
wherein the controller controls, when the read count value of a memory block on which the read operation has been performed among the memory blocks is equal to or greater than a first preset value, the memory device to perform the read reclaim operation on the memory block, and
wherein the controller generates, when the read count value of the memory block is less than the first preset value, the level information based on the read count value.

3. The memory system according to claim 2, wherein the controller comprises:
a processor configured to generate a command queue in response to the host command, and control the read reclaim operation or generate the level information based on the read count value of each of the memory blocks; and
a flash control circuit configured to control the memory device to perform the read reclaim operation or the garbage collection operation in response to the command queue.

4. The memory system according to claim 3, wherein the processor comprises:
a flash translation layer configured to generate the command queue corresponding to the read operation or the garbage collection operation in response to the host command, and map logical addresses received along with the host command to physical addresses of the memory device; and
a read reclaim control block configured to manage the read count value of the memory block on which the read operation has been performed, and control the read reclaim operation or generate the level information based on the read count value.

5. The memory system according to claim 4, wherein the read reclaim control block comprises:
a read count storage block configured to manage the read count value of each of the plurality of memory blocks, and increase and count the read count value of the memory block on which the read operation has been performed;
a target block select block configured to select, when the read count value of the memory block is equal to or greater than the first preset value, the memory block as a victim block;
a read count level determination block configured to generate, when the read count value of the memory block is less than the first preset value, the level information including any one of a plurality of levels determined based on the read count value of the memory block; and
a read reclaim control unit configured to control the flash control circuit to perform the read reclaim operation on the victim block.

6. The memory system according to claim 5, wherein, when the level information is generated from the read count level determination block, the flash translation layer checks logical addresses corresponding to the memory block on which the read operation has been performed, matches the level information to the checked logical addresses, and outputs the level information matched to the logical addresses to the host.

7. The memory system according to claim 1, wherein the controller outputs the level information along with a command response signal for the host command to the host.

8. The memory system according to claim 1, wherein the host comprises:
a host processor configured to generate the host command and logical addresses, and output the host command and the logical addresses to the controller; and
a garbage collection control block configured to increase a read count value of each of logical addresses on which the read operation has been completed among the logical addresses, and select logical addresses on which the garbage collection operation is to be performed depending on the read count values of the logical addresses,
wherein the host processor generates the host command for requesting the garbage collection operation when the number of logical addresses selected by the garbage collection control block is equal to or greater than a preset value.

9. The memory system according to claim 8, wherein the garbage collection control block weights the read count value of each of the logical addresses based on the level information.

10. The memory system according to claim 8, wherein the garbage collection control block selects, as an urgent logical address, one among the logical addresses based on the level information.

11. The memory system according to claim 10, wherein the host processor immediately generates, when the garbage collection control block selects the urgent logical address, the host command for requesting the garbage collection operation.

12. A memory system comprising:
a memory device including a plurality of memory blocks;
a controller configured to control the memory device to perform a read reclaim operation based on a read count value of a memory block on which a read operation has been completed or generate level information based on the read count value of the memory block; and
a host configured to manage, based on the level information, a read count value of each of logical addresses corresponding to memory blocks on which the read operation has been completed and output a host command corresponding to a garbage collection operation of the memory device based on the read count value of each of the logical addresses,
wherein the level information is a ratio of the read count value with reference to a read count threshold value of the read reclaim operation.

13. The memory system according to claim 12, wherein the controller comprises:

a processor configured to generate a command queue in response to the host command, and control the read reclaim operation or generate the level information based on the read count value of each of the memory blocks; and a flash control circuit configured to control the memory device to perform the read reclaim operation or the garbage collection operation in response to the command queue.

14. The memory system according to claim 12, wherein the host comprises:

a host processor configured to generate the host command and output, to the controller, the host command along with a logical address on which the read operation is to be performed; and a garbage collection control block configured to increase, if the read operation has been completed, a read count value of the corresponding logical address, and select logical addresses on which the garbage collection operation is to be performed depending on the read count values of the logical addresses, wherein the host processor generates the host command corresponding to the garbage collection operation when the number of logical addresses selected by the garbage collection control block is equal to or greater than a preset value.

15. The memory system according to claim 14, wherein the garbage collection control block weights the read count value of each of the logical addresses based on the level information.

16. The memory system according to claim 14, wherein the garbage collection control block selects, as an urgent logical address, one among the logical addresses based on the level information, and wherein the host processor immediately generates, when the garbage collection control block selects the urgent logical address, the host command corresponding to the garbage collection operation.

17. A method of operating a memory system, comprising:

performing a read reclaim operation based on a first read count value of a memory block on which a read operation has been completed, or generating level information of the first read count value;

managing, based on the level information, a second read count value of each of logical addresses corresponding to memory blocks on which the read operation has been completed; and performing the garbage collection operation based on the second read count value of each of the logical addresses, wherein the level information is a ratio of the read count value with reference to a read count threshold value of the read reclaim operation.

18. The method according to claim 17, wherein the managing comprises increasing the second read count value of a first logical address on which the read operation has been performed among the logical addresses and weighting the second read count value of each of the logical addresses based on the level information.

19. The method according to claim 18, wherein the garbage collection operation is performed when the number of logical addresses each having the second read count value equal to or greater than a preset value among the logical addresses is equal to or greater than a preset number, and wherein the garbage collection operation is immediately performed to at least one logical address, which is determined as an urgent logical address based on the level information among the logical addresses.

* * * * *